United States Patent [19]
Gilles et al.

[11] Patent Number: 5,160,636
[45] Date of Patent: Nov. 3, 1992

[54] PROCESS FOR THE TREATMENT OF MIXED WASTES

[75] Inventors: Greg Gilles, North Aurora; Matt Husain, Wheaton, both of Ill.

[73] Assignee: Chemical Waste Management, Inc., Oak Brook, Ill.

[21] Appl. No.: 822,424

[22] Filed: Jan. 17, 1992

[51] Int. Cl.$^5$ .............................................. B01D 11/02
[52] U.S. Cl. .................................. 210/763; 210/804; 210/805; 210/806
[58] Field of Search ............... 210/634, 758, 762, 763, 210/767, 774, 776, 790, 800, 803, 804, 805, 806, 808, 638, 681, 682

[56] References Cited

U.S. PATENT DOCUMENTS

| | | |
|---|---|---|
| 3,127,243 | 3/1964 | Konikoff . |
| 3,487,016 | 12/1969 | Livingston . |
| 3,642,582 | 2/1972 | Greenberg et al. . |
| 3,688,120 | 6/1972 | Patterson . |
| 3,804,756 | 4/1974 | Callahan et al. . |
| 3,823,088 | 7/1974 | Box et al. . |
| 3,992,295 | 11/1976 | Box et al. . |
| 3,997,440 | 12/1976 | Box et al. . |
| 4,021,500 | 5/1977 | Rogers . |
| 4,062,772 | 12/1977 | Box et al. . |
| 4,072,608 | 2/1978 | Farha et al. . |
| 4,141,829 | 2/1979 | Thiel et al. . |
| 4,268,399 | 5/1981 | Box et al. . |
| 4,279,693 | 7/1981 | Kuhnlein . |
| 4,294,708 | 10/1981 | Kakihara et al. . |
| 4,330,513 | 5/1982 | Hunter et al. . |
| 4,632,766 | 12/1986 | Firnhaber et al. . |
| 4,699,720 | 10/1987 | Harada et al. . |
| 5,045,240 | 9/1991 | Skirba et al. . |

OTHER PUBLICATIONS

Destruction of Volatile Organic Compounds Via Catalytic Inceneration, Tichenor; Palazzol; Env. Prog 6:3 (Aug. 1987) pp. 172-176.
ASME Publication: Development History of the RCC Brine Concentrating Cooling Tower Blowdown; J. H. Anderson.

Primary Examiner—Frank Sever
Attorney, Agent, or Firm—Allegretti & Witcoff, Ltd.

[57] ABSTRACT

A process is presented for treating and detoxifying mixed wastes, especially those containing volatile chemically oxidizable organics, nonvolatile inorganics and radioactive pollutants. The process combines an efficient extraction system, a filtration step, and evaporation system to concentrate the pollutants originally present in the mixed waste and a catalytic oxidation reaction to convert the volatilized organic and inorganic pollutants. A condensate product is obtained that is recycled internally to provide a closed system that discharges only inert gases and treated solid products.

16 Claims, 2 Drawing Sheets

PROCESS FOR THE TREATMENT OF MIXED WASTES

BACKGROUND OF THE INVENTION

A. Field of the Invention

This invention relates generally to the treatment, extraction, and detoxification of contaminated mixed solid wastes including soils, sludges, and contaminated debris that contain hazardous and radioactive contaminants. The treatment of these contaminated streams has become a national environmental priority, since such streams are being created by so many sources such as landfills, surface impoundments, research, industry, power plants, government and many other chemical, pharmaceutical, biological, electroplating, photographic processes and waste generators.

More specifically this invention involves a novel process that extracts and concentrates contaminates from solid waste materials and catalytically oxidizes volatile pollutants, all of which are contained in the mixed wastes that can be treated by this invention. The novel process disclosed herein couples an extraction system for dissolution of the contaminants, a solid/liquid separation system coupled with efficient evaporation and gas phase catalytic oxidation. Optionally, this process can provide for the recapture of soil or debris that is substantially free of the contaminants and that may, therefore, be safely returned to the site or the removal area.

B. Description of Prior Processes

The treatment and purification of solid waste materials contaminated with hazardous and radioactive compounds has long been a problem because of the difficulties associated with removing these types of contaminants from the solids. More often than not solid wastes contain volatile and nonvolatile components that, if not properly treated, would cause massive pollution of the environment.

The art has recognized a number of processes for treating various types of wastes, several of which involve evaporation steps to concentrate the solids phase prior to further treatment of the concentrated solids. Treatment of harmful volatile components prior to introduction in the environment is also known to the art. An oxidation process is the most typical of treatment processes for volatilized contaminants.

Likewise, the art describes many extraction processes, including soil washing and solvent extraction processes. Each of these processes use a variety of combined equipment. Mixing tanks and other solids/liquid contacting devices are known. A particular liquid/solid contactor is a waste pulper, known as a Hydrapulper, manufactured by Black Clawson located at Middletown, Ohio which has been used for many years in the paper industry to defiber wood pulp. It has been used for tar sand processing. Hydrapulper literature from Black Clawson indicates that the apparatus may be used in applications besides pulping. Possible applications disclosed include chemicals, rendering and agricultural residues.

U.S. Pat. No. 4,005,480 (Smith, et al.) describes the use of a waste pulper similar to those used in the lumber industry to reduce the size of tar sand pieces. U.S. Pat. No. 3,788,568 (Marsh) describes the use of a waste pulper to grind municipal wastes for classification purposes.

Evaporation processes for treating polluted waste streams are well known to the art. In particular vertical tube falling film evaporation with vapor recompression has been suggested to efficiently concentrate wastewater streams containing a high concentration of total dissolved solids. The use of such evaporators is described in an ASME publication entitled "Development History of the RCC Brine Concentrator For Concentrating Cooling Tower Blow Down", by J.H. Anderson, 1976.

Distillation of water and catalytic oxidation of residues in sewage and other contaminated liquids by contacting the wet waste with a molten salt is disclosed in U.S. Pat. No. 3,642,582 (Greenberg et al.). The molten salt provides two functions. The first is a heat transfer medium to effect evaporation of the water in the waste and the second is to catalyze the oxidation of organic residue remaining after evaporation. Likewise, in U.S. Pat. No. 3,688,120 (Patterson) molten metal is used to convert human organic waste into harmless gases. A bath of molten lead, maintained at 620° F. to 900° F., is the preferred metal to effect evaporation of water and oxidation of organic compounds in the waste stream.

In general, oxidation of organic compounds dissolved in wastewater streams is well known in the art. Both liquid phase and vapor phase oxidation processes are known. For example, industrial fluids, such as dyestuff solutions, can be purified using the process disclosed in U.S. Pat. No. 4,279,693 (Kuhnlein et al.). This process involves evaporation of impurities from polluted fluids where approximately 90% of the volatile impurities remain untreated or are subjected to flame combustion at temperatures ranging from 800°-1000° C. A small percentage of the impurities (approximately 10%) may be removed from the nonvolatiles and destroyed in a catalytic oxidation process. The catalytic oxidation process operates in a nonstream environment with a low water-to-organic ratio. U.S. Pat. No. 4,141,829 (Thiel et al). discloses a two step oxidation process. In the first step a contaminated water stream is subjected to a liquid oxidation process to destory the majority of the organic substances in the liquid stream. Any volatile organics remaining after the liquid oxidation step are heated and catalytically oxidized in a gas phase reactor. U.S Pat. No. 4,021,500 (Rogers) discloses an improved oxidative dehydration system to catalytically remove dissolved hydrocarbons. A hydrocarbon laden liquid water stream is mixed with an air/steam stream and is contacted with a solid catalyst to yield an effluent of water vapor, carbon monoxide and carbon dioxide.

U.S. Pat. No. 4,699,720 (Harada et al.) teaches a process for treating wastewater wherein a stream containing suspended solids, ammonia and chemically oxidizable substances is subjected to a liquid phase catalytic oxidation reaction. Separation of the suspended or dissolved solids occurs after the oxidation reaction by employing a reverse osmosis process. Likewise, U.S. Pat. No. 4,632,766 (Firnhaber et al.) discloses a method of treating wastewater wherein a concentrated "slime" containing water is subjected to a noncatalytic multi-stage oxidation in the presence of air or oxygen. Yet another wastewater treatment process using liquid phase catalytic oxidation is disclosed in U.S. Pat. No. 4,294,706 (Kakihara et al.). This reference suggests the removal of suspended solids prior to treatment (Column 3, lines 12-15).

Extraction of volatile contaminates from waste streams followed by catalytic destruction of the volatized contaminates has been practiced in the art. For example, U.S. Pat. No. 3,127,243 (Konikoff) teaches a process whereby human waste is subjected to a noncontinuous vacuum distillation process to produce vaporized materials that are passed to a high temperature catalytic reactor containing a noble metal catalyst. The reaction product is then condensed to produce potable water. Likewise, U.S. Pat. No. 3,487,016 (Zeff) teaches the oxidation of organic or inorganic materials in liquid or vapor phase using oxygen-containing gas and a catalyst containing either manganese or lead. Oxidation is performed at low temperatures and at atmospheric or less pressure. U.S. Pat. No. 3,804,756 (Callahan et al.) teaches that volatile impurities may be steam stripped from wastewaters and then chemically oxidized with a variety of catalyst formulations, with copper oxide being preferred.

The elimination of volatile organic compounds (VOC) from industrial/commercial waste gases is also well known in the art. Destruction of VOC is accomplished by catalytic incinerators. An article entitled, "Destruction of Volatile Organic Compounds Via Catalytic Incineration" authored by B. H. Tichenor and M. A. Palazzol, Environmental Progress, Volume 6, No. 3, August, 1987, reports the results of an investigation into various catalytic incinerator designs. Tests were performed by evaporating organic compounds into clean air streams and then passing the streams across a monolithically supported precious metal catalyst. Catalytic incineration of noxious industrial fumes is also disclosed in U.S. Pat. No. 4,330,513 (Hunter et al.). This reference discloses a process where fumes and waste gases containing hydrocarbons are contacted with a fluidized bed of nonprecious metal solid catalyst. Additionally, a series of U.S. Pat. Nos. 3,823,088; 3,992,295; 3,997,440; 4,062,772; 4,072,608 and 4,268,399 teach that waters containing minor amounts of dissolved organic materials can be purified by contacting either a liquid or gaseous phase with a promoted zinc albuminate catalyst.

Although the art has understood the need and has attempted the treatment of waste streams and contaminated gas streams, it has failed to solve the problem of efficiently treating mixed waste streams contaminated with volatile organics, toxic metals and radioactive contaminants. The present invention presents a novel continuous treatment method for extracting radioactive contaminants, concentrating those contaminants to a liquid phase, dewatering the treated solids, concentrating the nonvolatile components and chemically oxidizing volatile contaminants. Further, this invention presents a combination of extraction, and concentration in essentially a closed system whereby a small amount of extractant solution (blowdown) containing the contaminants and water are further treated by evaporation and catalytic oxidation.

SUMMARY OF THE INVENTION

This invention is directed toward a novel process for the treatment of mixed solid wastes. More specifically the invention provides a means to extract contaminants from soils, sludges and other solids, dewater the treated materials, concentrate the contaminants, and convert chemically oxidizable volatile pollutants to harmless inorganic gases. This process also has the potential to produce material that is sufficiently clean for land disposal.

It is an object of this invention to provide a process that eliminates the environmental problems commonly associated with the disposal of mixed wastes containing organics, toxic metals and radioactive contaminants.

Another object of this invention is to provide a process that integrates soil washing, chemical extraction, filtration, concentration of extracted contaminants, and catalytic destruction for the treatment of mixed solid wastes.

Yet another object is the ability to concentrate contaminants into a very small quantity of waste for final disposal and thus achieve a high volume reduction.

Still another object of this invention is to minimize the use of extraction/washing chemicals by recycling of a filtrate containing the extraction chemicals.

Accordingly a broad embodiment of the invention is directed to a process for continuously treating a mixed waste stream containing radionuclides, volatile chemically oxidizable pollutants and nonvolatile pollutants comprising the steps of (a) mixing the mixed waste and an extractant solution at conditions sufficient to effect the mass transfer of at least a portion of the radionuclides, volatile chemically oxidizable pollutants, and nonvolatile pollutants from the solids present in the mixed waste to the extraction solution;

(b) removing the solids from the mixture of step (a) initially present in the mixed waste;

(c) mixing the solids from step (b) with a treated water stream;

(d) filtering and pressing the mixture from step (c) to form a filter cake and a dilute contaminant liquid stream;

(e) recycling the dilute contaminant liquid stream to the mixture of step (a);

(f) removing a contaminated liquid stream comprising the radionuclides, volatile chemically oxidizable pollutants, and nonvolatile pollutants from the mixture of step (a);

(g) continuously concentrating the radionuclides and nonvolatile pollutants in the contaminated liquid stream by continuous evaporation that simultaneously produces a first stream comprising the concentrated radionuclides and nonvolatile pollutants and a second water rich vapor phase stream substantially free of minerals, dissolved solids and metals, and comprising the volatile chemically oxidizable pollutants originally present in the contaminated liquid stream;

(h) removing the first stream comprising concentrated radionuclides and nonvolatile pollutants;

(i) contacting substantially all of the second stream with a solid oxidation catalyst in the presence of steam at gas phase oxidation conditions to convert the volatile chemically oxidizable pollutants, thereby producing a gaseous reaction product comprising steam and incondensible gases, the solid oxidation catalyst comprising an inorganic oxide support containing at least one metal oxide;

(j) condensing and scrubbing the stream from step (i) to produce the treated water stream; and, (k) recycling the treated water from step (j) for mixing with the solids from step (b) and with the mixed waste and extraction solution of Step (2).

These as well as other embodiments of the present invention will become evident from the following, more detailed description of certain preferred embodiments.

BRIEF DESCRIPTION OF THE DRAWINGS

The accompanying drawings illustrate preferred embodiments of the invention. Specifically.

DETAILED DESCRIPTION OF PREFERRED EMBODIMENTS

Figure 1:
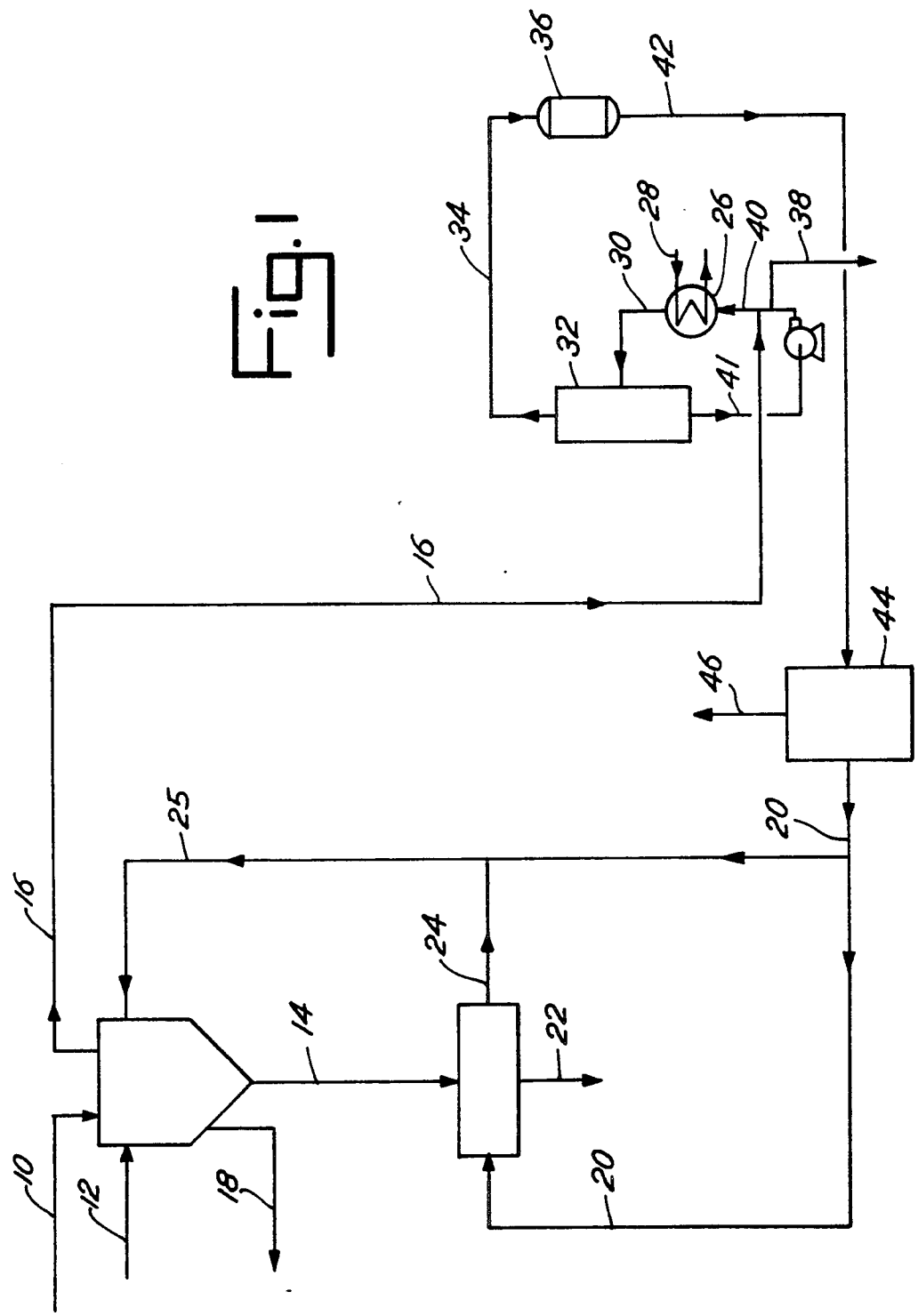
FIG. 1 is a flow diagram of an embodiment of the invention illustrating the treatment of a mixed waste containing solids contaminant with hazardous and radioactive compounds radioactive using a multi-stage extraction system, a filtration or dewatering system, and an evaporation and catalytic oxidation system.

The instant invention is capable of processing a variety of mixed wastes, including soils of all types, including clays, silts and sands. Sludges, aggregates, and debris, such as scrap metal, plastics, and cellulosic materials can also be treated. For example, this invention can process radioactive and hazardous waste contaminated soils, sediments, PCB contaminated soils and miscellaneous inorganic debris. The particle size of the solids contained in the mixed waste introduced into the extraction system can consist of nonflowable debris since the extraction system provides a means to remove or break-up over-sized items. Larger agglomerated particles and debris, such as from hazardous waste landfills, can be ground to size or comminuted by existing techniques, thus making this process applicable to most forms of mixed waste materials.

Mixed wastes can be generally characterized as solids materials contaminated with hazardous organic, inorganic and radioactive compounds. Many such mixed wastes are contaminated with radionuclides and volatile chemically oxidizable pollutants comprising both organic and inorganic compounds. In addition, the mixed wastes many times contain nonvolatile pollutants. The volatile chemically oxidizable pollutants include compounds, such as alcohols, ketones, esters, aromatic hydrocarbons (benzene, toluene, ethylbenzene, etc.), chlorinated hydrocarbons (TCE, TCA, PCE, carbon tetrachloride, etc.), ammoniacal compounds, cyanide and sulfur containing compounds, and a variety of other chemicals that are known pollutants. The nonvolatile pollutants typically comprise organics such as petroleum hydrocarbons, oils (hydraulic, motor, lube, bearing, etc.), polychlorinated biphenyls (PCB's), and minerals, which are broadly defined as any element, inorganic compound or mixture occurring or originating in the earth's crust and atmosphere, including all metals and nonmetals, their compounds and ores. Included in the dissolved solids can be compounds of heavy metals, such as, barium, copper, beryllium, aluminum, nickel, zinc, cadmium, mercury, arsenic, and lead. Radioactive contaminants include such elements as uranium, plutonium, cesium, thorium, radium, americium, neptunium, strontium and cobalt.

The process of the invention is particularly well suited for the treatment of soils (clay, silt, sand, etc.), aggregates, scrap metal, plastics, cellulosic debris, sludges, filter cakes and scale.

According to the invention, the particular mixed waste to be treated and detoxified is first subjected to an extraction step. The purpose of the extraction step is to intimately contact a mixed waste stream with an extractant solution to effect the transfer of the contaminants from the mixed waste solids into the liquid phase. This can be accomplished in a single extraction stage or in multiple extraction stages. The extractant solution can comprise any aqueous solution that enhances the mass transfer of contaminants from the solid materials in the mixed waste to the liquid phase contained in the exterior. A preferred extractant solution comprises water and an additive selected from the group consisting of acids (sulfuric, nitric and formic), bases (sodium hydroxide), surfactants (anionic and non-ionic), chelating agents (EDTA, citric acid, gluconic acid and EDA), emulsifying agents (detergents) and mixtures thereof. Other additives that can be used in the extractant solution include sodium carbonate, carbonic acid, oxygen, Fenton's Reagent, Triton X-100 surfactant and magnetite (iron ferrite).

The extractant solution and mixed waste are mixed at conditions sufficient to provide intimate contact between the contaminated solid material of the mixed waste and the extractant solution. The preferred conditions are temperatures in the range of from about ambient temperature to about 150° F. and atmospheric pressure. The water used to prepare the extractant solution is preferably obtained from the condensate of the gaseous reaction products obtained from the catalytic oxidation reactor, also referred to as high quality treated water. However, make-up water is also used when necessary to prepare the extractant solution. The additives and the water are preferably pre-mixed in an extractant solution mix tank prior to introduction into the extractor and contact with the mixed waste.

The first step in the process involves introduction of the mixed waste into an extraction stage which consists of an extractor and a solid/liquid separator. Also introduced to the extractor is the extractant solution. The mixed waste and extractant solution are brought into intimate contact with one another and the extractant solution effects the mass transfer of the contaminants from the solids initially contained in mixed waste into the liquid phase of the extractor. The mixed waste stream and extractant solution forms a well mixed extraction liquor in the extractor. This well mixed extraction liquor is directed to a solid-liquid separator where extracted solids are separated as a slurry from a liquid stream now contaminated with the radioactive and hazardous compounds.

The extractor of this invention can be any apparatus capable of affecting the contact of the mixed waste stream with the extractant solution. Examples of useful extractors include fluidized bed contactors, leaching columns, mixed tanks, screw-conveyor extractors, pulpers/mixers or any other extractor known in the art capable of inducing solid/liquid extraction.

It is preferred that the extractor operate continuously. One type of continuous extractor that can be used in this invention is a waste pulper that is capable of vigourously contacting a continuously flowing mixed waste stream with a continuously flowing extractant solution stream to form an emulsified extraction liquor. This type of pulper uses a rotor blade in a vessel. This blade grinds, mixes, suspends and/or emulsifies the mixture of extractant solution and mixed waste. The resulting emulsified extractant solution passes through holes in a screen below the rotating blade. This material is then directed to a solid/liquid separator prior to advancing the mixture of solids and extractant solution to the next extraction stage. Oversized material is also reduced in size or removed directly from the pulper. The oversized material includes any material that cannot pass through the screen.

The accumulated oversized material can be removed continuously or periodically from an opening or a valve in the side of the pulper. This opening allows the oversized material to be captured in a collection vessel. The first valve is closed, and any emulsified extraction liquor is directed back to the waste pulper by opening a valve on a liquid return line. When the valve is closed, a second gate valve is opened and the oversized material is directed to a oversized material accumulator, usually a hopper or drum. The oversized material can then be disposed of or decontaminated with water or extractant solution.

The frequency at which oversized material is removed from the extraction stage will depend upon the amount of oversized materials in the mixed waste that is fed to the extraction stage. The oversized material can be classified for recovery, recycled, disposed of in a landfill, incinerated, or it can undergo any waste mafe- rial processing known to one in the art.

The extraction liquor and solids are directed to a solid/liquid separator where the emulsified extraction liquor is separated into a slurry of solids and a contaminated liquid stream that is primarily recycled to the extractor. The solid/liquid separator may be any apparatus that is capable of separating liquor with suspended solids into a slurry of solids and a liquid fraction. Useful solid/liquid separators include, for example, settling vessels, filters, centrifuges, expression devices, and cyclones. It is preferred that the solid/liquid separator operate continuously. Therefore, a preferred solid/liquid separator is the cyclone. The cyclone is an efficient gravity settling device. In the preferred process, the extraction liquor containing the suspended solids tangentially enters the cyclone, a cylindrical or conical chamber. A concentrated solids stream is removed from a bottom central opening in the cyclone while a contaminated liquid stream is removed from a top central opening in the cylone.

The solids in the emulsified extraction liquor tend to move towards the outside of the cyclones wall by virtue of their inertia where they settle into a receiver. A cyclone is merely a settler which uses centrifugal acceleration instead of gravity acceleration as the setting impetus.

The slurry of solids from the solid/liquid separator and the contaminated liquid stream may be directed to a second extraction stage. In a preferred embodiment, the extraction system of this invention includes two extraction stages, the first extraction stage includes a pulper and a cyclone and the second stage a mixer and a cyclone. In the two stage extraction, the mixed waste and the extractant solution can flow concurrently from the first extraction stage to the second extraction stage or they can flow counter currently. It is preferred that the mixed waste and the extractant solution flow counter currently through the two stage, or multi-stage extraction step.

In the counter current extraction flow situation, the mixed waste is introduced into the first extraction stage while the fresh make-up extractant solution is introduced into the last stage extractor. A slurry of solids recovered from the first solid/liquid separator is directed to the second extraction stage, and the contaminated liquid stream from the final stage solid/liquid separator is directed to the penultimate extractor. This counter current flow pattern is repeated such that a final contaminated liquid stream (or blowdown) is removed from the first stage solid/liquid separator and a final slurry of solids is removed from the final stage solid/liquid separator. By operating the extraction system counter currently the extraction driving force, i.e., the contaminant concentration difference between the liquid and solids is maximized, thereby maximizing extraction efficiency.

The next step in the process is a filtration stage. To obtain a solid product from the slurry of solids generated by the extraction stage, any process that can dewater the extracted solids may be used. A preferred process involves further extraction of the solids in a filtration stage with high quality treated water prior to discharging a filter cake. A slurry of treated water and the extracted solids can be subjected to pressure filtration and further washing in the filtration stage. The high quality treated water is preferably obtained from the condensate of a gaseous catalytic reaction of the volatiles extracted from the mixed waste. However, the water, or an alternative slurrying liquid may be obtained from a source external to the process. The resultant filter cake is then removed from the process at approximately 60% by weight on solids. The filtrate from the filtration system is recycled to the extraction stage.

Depending on the type of mixed waste treated, the recovered filter cake from the filtration stage may represent a valuable product, such as a raw material substitute or backfill material. Preferably the extraction stage is operated such that essentially all of the contaminants are removed from the solids initially contained in the mixed waste and the resultant filter cake can be returned to the original site for burial or to an off-site disposal facility. In instances where the filter cake contains residual contaminants, stabilization may be used as a supplemental treatment method, including both physical and chemical stabilization. Any stabilization process known to the art may be used, however, chemical fixation and solidification processes for producing solid wastes suitable for ultimate disposal in landfills or other secure sites are most preferred. These processes involve adding stabilizing agents, for example, fly ash, asphalts, alkali metal silicates, all forms of cements, pozzolans, gypsum, calcium chloride, kiln dusts, lime, or other known stabilizing agents, to the filter cake. The addition of the stabilizing agents to the filter cake can be performed using an inline or batch process. After mixing and curing, the filter cake/stabilizer mixture forms a stabilized solid with enhanced properties. The stabilized product may then be disposed of following accepted disposal practices. Alternatively, the solid may be used as building materials, as landfill to support buildings, to reclaim coastal lands, or to build levees or dikes.

The final stage of the process involves evaporation and catalytic oxidation. The contaminated liquid stream or blowdown stream from the first solid/liquid separator of the extraction stage is advanced to a further concentration system that uses evaporation and gas phase catalytic oxidation to concentrate the extracted contaminants in a small volume waste stream for disposal. The unit operation performed in the evaporation step necessarily includes an evaporator and details need not be included herein. Any evaporation design that can dewater the solids from a dilute solution of waste solids and produce steam substantially free of dissolved solids can be used in the invention. Examples of known evaporator designs include forced circulation, submerged tube forced circulation, Oslo-type crystallizer, short and long tube vertical, horizontal tube, and falling film. Evaporation may be effected with a stirred tank reactor, and, in particular, by using a back-mix reactor design where the concentration of constituents in the effluent of the reactor is equivalent to that in the reactor. A forced circulation evaporator is the preferred design for the evaporative reactor.

The process conditions for the evaporation step include a temperature of from about 100° C. (212° F.) to about 130° C. (266° F.) and a pressure from about subatmospheric to about 790 kPa (abs) (100 psig), with most preferred temperature and pressure ranges from about 105° C. (221° F.) to about 125° C. (257° F.) and from about atmospheric to about 446 kPa (abs) (50 psig), respectively. Waste solids retention time in the evaporation system depends upon the water release characteristics of the solids and may be as little as 0.25 hrs. to as much as 6 hrs., more preferably from about 1 hr to about 4 hrs.

The residual waste solids or brine that accumulates in the bottom of the evaporator as a result of the vaporization of water and volatile contaminants from the contaminated liquid stream, are withdrawn from the process in a first stream. The first stream comprises the radionuclides and nonvolatile pollutants originally contained in the mixed waste fed to the extraction system. The first stream can be removed continuously or periodically. If desired, this stream can be split into a recycle stream and a slip stream. The removal of a low-volume slip stream from the evaporation system to concentrate the solids provides for a continuous and steady state operation. By constantly removing the first stream or the slip stream, a steady state amount of accumulated residual waste solids is maintained in the evaporation system, permitting operation at the solids retention time required for dewatering. The first stream or slip stream, which comprises a mixture of concentrated radionuclides and nonvolatile contaminants can be continuously removed from the process for disposal. Removal of the slip stream is effected by withdrawing the concentrated stream of pollutants from the bottom of the evaporator, removing a low volume of this mixture and returning the balance of the mixture to the evaporator.

A second stream is removed from the evaporator that comprises steam and the volatile chemically oxidizable compounds, is contacted with a solid catalyst in a reaction zone maintained at oxidation reaction conditions. In some instance it may be desirable to pass the volatilized pollutants and steam through an entrainment separator prior to contact with the catalyst. The chemically oxidizable volatile compounds that were volatized when the contaminated liquid stream or blowdown stream was introduced into the evaporator are oxidized to produce a gaseous reaction product comprising substantially steam and incondensible gases, primarily carbon dioxide and nitrogen. The second stream typically comprises at least 95 wt % of all of the volatile chemically oxidizable pollutants originally contained in the blowdown stream. Preferably, the second stream contains at least 96 wt % and more preferably at least 99 wt % of the volatile pollutants present in the blowdown stream. In the most preferred embodiment, substantially all of the volatile pollutants originally in the blowdown stream are contained in the second stream. As such, substantially all of the volatile pollutants originally present in the mixed waste originally fed to the process are catalytically oxidized in the reaction zone.

The second stream from the evaporation system contains substantially all of the water originally contained in the contaminated liquid stream from the extraction system. The water in the second stream is directed to the catalytic oxidation reactor in the vapor state as steam. The second stream contains significantly more steam than volatile pollutants. Typically the steam-to-organic weight ratio is greater than 2:1. More preferably, the quantity of steam in the second stream is at least 16 times the weight of volatile pollutants contained therein. In other words, in the most preferred embodiment the volatile pollutant component of the second stream is less than 10% of the total components in the stream.

Although not completely understood and not wishing to be bound by a particular theory it is believed that the presence of steam in the oxidation reactor is beneficial to achieving complete oxidation of volatile pollutants. It is believed that the steam directly participates in the oxidation of pollutants either by reacting catalytically, thermally, or through steam reforming chemistry with partially oxidized compounds. This theory of direct steam participation in pollutant removal could also help explain the apparent lack of a large oxygen effect, since steam is so overwhelmingly present. In fact, the oxidation of pollutants can be performed by providing less than the stoichiometric amount of oxygen. Of course, each different type of mixed waste will have a different stoichiometric requirement of oxygen, but because of the high ratio of steam to volatile pollutants present in the reaction zone, high conversions of pollutants are achieved at less than the stoichiometric amount of oxygen.

Prior to the oxidation step the second stream may be compressed by mechanical means or by a steam jet to increase the latent heat value of the second stream. A preferred means to compress the second stream is by compressors powered by steam turbines. These steam turbines can be operated in cogeneration mode using landfill biogas, steam from an incinerator waste heat recovery unit, or other similar source. Energy cost reductions and high cogeneration efficiencies can be realized using steam turbine powered compressors and pumps. Likewise, the gaseous reaction product that results from the oxidation step may be compressed, in preference to the compression of the second stream, to increase its latent heat value. In either case the latent heat can be used to provide the partial or total heat requirement needed in the evaporation system.

The catalytic oxidation is performed in a reactor at gas phase conditions using a solid catalyst. The oxidation reaction conditions include a reaction temperature in the range of from about 204° C. (400° F.) to about 1200° C. (2192° F.). Most preferably the reaction temperature should be maintained in the range from about 371° C. (700° F.) to about 677° C. (1250° F.). The gas space velocity of the water rich vapor phase stream in the reaction zone is from about 0.1 sec$^{-1}$ to about 1000 sec$^{-1}$, most preferably from about 5 sec$^{-1}$ to about 100 sec$^{-1}$. The reaction zone pressure preferably is in the operating range of from subatmospheric to about 790 kPa (abs) (100 psig), with a most preferred operating pressure of from about atmospheric to about 446 kPa (abs) (50 psig). The chemically oxidizable compounds in the second stream are catalytically oxidized in the presence of the steam that was formed in the evaporation system.

The solid catalyst used in the oxidation zone may be selected from any of the known commercially existing oxidation catalyst compositions, or mixtures of known oxidation catalysts, that meet the required standards for stability and activity and that possess a high selectivity for oxidation of volatile organic and inorganic compounds. The active component of the oxidation catalyst is a metal, preferably a nonprecious metal, supported on a solid carrier. The preferred solid carrier is alumina. However, any known carrier may be used, for example, silica, silica-alumina, clay or like materials. The carrier may be in the form of spheres, pellets or extrudates. The amount of active metal on the catalyst is preferably from about 5 to about 50 weight percent, based on the total catalyst weight. More preferably the metal component comprises from about 15 to about 25 weight percent of the catalyst. A preferred oxidation catalyst composition includes chromic oxide and alumina in the form of an extrudate. This preferred catalyst and its method of preparation are more thoroughly described in U.S. Pat. No. 4,330,513 (Hunter et al), which is incorporated herein by reference.

The oxidation reaction of this invention is exothermic and can cause reaction temperatures to increase to excessive levels. To prevent temperatures from exceeding approximately 1200° C. (2192° F.), a quench stream may be added to the oxidation reaction zone. A preferred quench medium is the condensate product obtained from the evaporator. Depending upon the chemical oxygen content of the second stream and the level of chemically oxidizable compounds to be reacted, it may be necessary to supply additional chemical oxygen as a reactant to achieve the high level of conversion required in the oxidation reaction. Additional chemical oxygen can be supplied by any known means, with the injection of air, oxygen enriched air, or $O_2$ being preferred. On initial start-up of the oxidation reactor it may be necessary to use an external heat source to increase the temperature of the reactants to a point where the oxidation reaction will begin. This external heat source can be supplied from either direct or indirect sources. Indirect sources include electrical heating and conventional heat exchange equipment. Direct heating includes direct gas fired heating of the second stream. To maintain the appropriate inlet reactor temperature of the reactants during the process it may be necessary or desirable to perform indirect heat exchange of the reactants with a portion of the reaction products. Alternatively, the reactants may be heated by direct fired heat prior to introduction into the oxidation reactor. Any direct fired heating process known to the art may be used.

The oxidation reaction step of the invention is capable of catalytically oxidizing a wide range of volatile organic and inorganic compounds, including halogenated organics, organophosphorus compounds, organosulfur compounds and organonitrogen compounds. The gaseous reaction product obtained from the oxidation of such compounds may be highly acidic, containing HCl, $PO_x$, $SO_x$ and $NO_x$. The acidic nature of the product can have deleterious effects on downstream equipment metallurgy. Neutralization of the acidic gaseous reaction products can prevent corrosion and the eventual destruction of downstream equipment. Any neutralization process known to the art may be used to neutralize the acidic reaction products, including solid scrubbers, liquid scrubbers, or a combination of both. A preferred neutralization method involves the use of a limestone bed located downstream of the oxidation reactor. The inherent alkalinity of limestone will neutralize and remove strongly acidic gases contained in the gaseous reaction stream. Depending upon the amount of acidic gas present, multiple limestone beds arranged in series flow may be employed. A preferred type of limestone is dolomitic limestone, which contains a carbonate of calcium and magnesium. The magnesium is better suited to capture volatized borates and arsenates.

In addition to the neutralization of acidic gases in the gaseous reaction product, the limestone bed may also be utilized as a temperature control means when the gaseous reaction product is used to supply the heat of evaporation in the evaporative reactor. Temperature control may be desirable to prevent thermal stress of the reactor. Thermal stress occurs because the gaseous reaction product from the highly exothermic catalytic oxidation reaction can, in some instances, be several hundred degrees higher in temperature than the normal operating temperature of the reactor. Normally it is preferred that the medium used to supply the heat of evaporation be only 5° to 17° C. (9° to 30° F.) higher than the boiling point of the volatile compounds in the aqueous waste to be evaporated. An alternative means to prevent thermal stress is to quench the gaseous reaction products, preferably using a portion of the condensate product stream.

Although oxidation of the chemically oxidizable compounds in the second stream is preferably performed using a solid supported metal catalyst, it is within the scope of the invention to perform the oxidation step by any catalytic means or combination of means known to the art. For example, the oxidation reaction may be performed by ultraviolet light catalyzed peroxide or ozone oxidation.

The composition of the gaseous reaction product exiting from the oxidation reactor comprises substantially steam and incondensible gases, primarily carbon dioxide and $N_2$. The gaseous reaction product is condensed to produce a treated water stream comprising substantially liquid water. Condensation can be performed by any method known to the art. One method is to pass the gaseous reaction product through an economizer to utilize its latent heat to effect the evaporation of the volatiles contained in the contaminated liquid stream from the extraction system. Alternatively, the condensation of the gaseous reaction product can be performed in an evaporator while simultaneously utilizing its latent heat to effect the evaporation of the volatiles contained in the aqueous waste. As the hot gaseous oxidation reaction product releases its heat to evaporate the volatiles, condensation occurs and the condensate produced is drawn off as a treated water stream. An elevated temperature condensate product stream or high quality treated water produced by the process of the invention is comprised of substantially liquid water that is free of minerals and organics and is used for extraction purposes in the filtration step described above. Alternatively the high quality treated water may be used in other processes or be directly disposed of to existing surface water receiving streams without the need for additional treatment.

A more complete understanding of the inventive concept of this invention may be obtained by a review of the accompanying drawings, which present preferred embodiments of the invention. The presentation of the embodiments are not intended to exclude from the scope of the inventive concept those other embodiments set out herein or other reasonable and normal modifications of the inventive concept. Details, such as miscellaneous pumps, heaters, coolers, condensers, start-up lines, valving and similar hardware, have been omitted as being nonessential to a clear understanding of the preferred embodiments of the invention.

FIG. 1 is a flow diagram of one preferred embodiment of the invention illustrating the treatment of a mixed waste containing organic, inorganic and radioactive pollutants. A mixed waste stream 10 is directed to a extraction stage along with extractant solution 12. Mixed waste stream 10 and extractant solution 12 are commingled in the extraction stage and thereafter separated into a slurry of solids 14 and a contaminated liquid stream 16. A product stream containing oversized materials 18 is also removed from the extraction stage. The oversized materials 18 are decontaminated, if necessary, and recycled or disposed of.

The solids 14 are directed to a filtration stage. In the filtration stage, the solids 14 are filtered and washed with treated water 20. The washed solids are filtered in the filter stage to produce a solid filter cake product 22 and a liquid filtrate 24. The liquid filtrate 24 is then directed to the extraction stage as extractor recycle stream 25. Extractor recycle stream 25 can comprise liquid filtrate 24, high quality treated water 20, fresh make-up extractant solution, or a combination thereof.

The contaminated liquid or blowdown stream 16 is direct to heat exchanger 26 where it is heated indirectly with heating medium, including for example with hot gaseous oxidation reaction product carried in line 28. The heated blowdown stream 30 is directed to evaporative reactor 32 where it is heated and maintained at a temperature in the range from about 240°-250° F.

The water and other volatile compounds contained in the blowdown stream are vaporized into a mixture of steam and chemically oxidizable compounds and are continuously removed from the evaporative reactor via line 34. The mixture of steam and chemically oxidizable compounds can be indirectly heated in a heat exchanger, mixed with an oxidizing agent, and contacted with a solid nonprecious metal oxidation catalyst in oxidation reactor 36. The amount of oxidizing agent added to the steam and chemically oxidizable compounds will vary depending on the oxygen demand of the chemically oxidizable components.

In the basic operation of evaporator 32 the blowdown liquid 16 containing the pollutants extracted from the mixed waste is introduced into the bottom of evaporator 32 directly in a heated mixture containing concentrated pollutants, also known as brine. The level of the brine in evaporator 32 is controlled by continuously or periodically removing from the process a portion of the brine. In the embodiment shown in FIG. 1, the blowdown liquid 16 is introduced in a recycle brine stream 40. Before introduction of blowdown liquid 16, a slip stream 38 is removed from the process.

This slip stream 38 has the same concentration of pollutants as the recycle brine stream 40. In some cases it may be advantageous to advance this slip stream 38 to a settling tank where any residual volatiles can be recovered and directed to the catalytic oxidation reactor 36 or to the evaporator. Slip stream 38, or in the event the brine is removed on a periodic basis, the concentrated pollutants can be further treated, reclaimed, or disposed of using any method available for disposal of hazardous or radioactive waste. Such methods include landfilling, incineration or chemical stabilization.

The degree of conversion of volatile pollutants in the oxidation reactor depends on 1) the degree of contamination of the mixed waste fed to the process, and 2) the tolerable level of pollutants in the stream ultimately exiting the process. The higher the level of pollutants in the incoming mixed waste, the greater degree of conversion will be achieved in the oxidation reactor. Similarly, if the level of contaminants allowable in the stream exiting the process is high, then a lower degree of conversion is required in the oxidation reactor. The goal to be accomplished by the oxidation reactor is not the percentage removal of pollutants, but rather is the removal of a sufficient quantity of pollutants such that the discharge stream from the process is not harmful to human health or the environment. Depending on the makeup of the mixed waste, the oxidation reactor can achieve at least 95% conversion and in some instances 99.9+% conversion, of the chemically oxidizable compounds in the second stream. This produces a gaseous reaction product 42 of substantially steam and incondensible gases, primarily carbon dioxide. The gaseous reaction product 42 is removed from the oxidation reactor. A portion of the gaseous reaction product 42 can be used as a preheat means for maintaining the temperature of the reactants entering oxidation reactor 36. Optionally, a steam compressor may be used to compress the gaseous reaction products 42 to increase their heat value.

Condensation of the gaseous reaction product is accomplished upon introduction of the gaseous reaction product 42 to a scrubber/condenser 44. The condensate formed in scrubber/condenser 44 is continuously removed from the process and used as a high quality treated water 20 in other process steps. Some non-condensable gas 46 is also removed from the scrubber/condenser. The non-condensable gas 46 is generally directed to the atmosphere.

Figure 2:
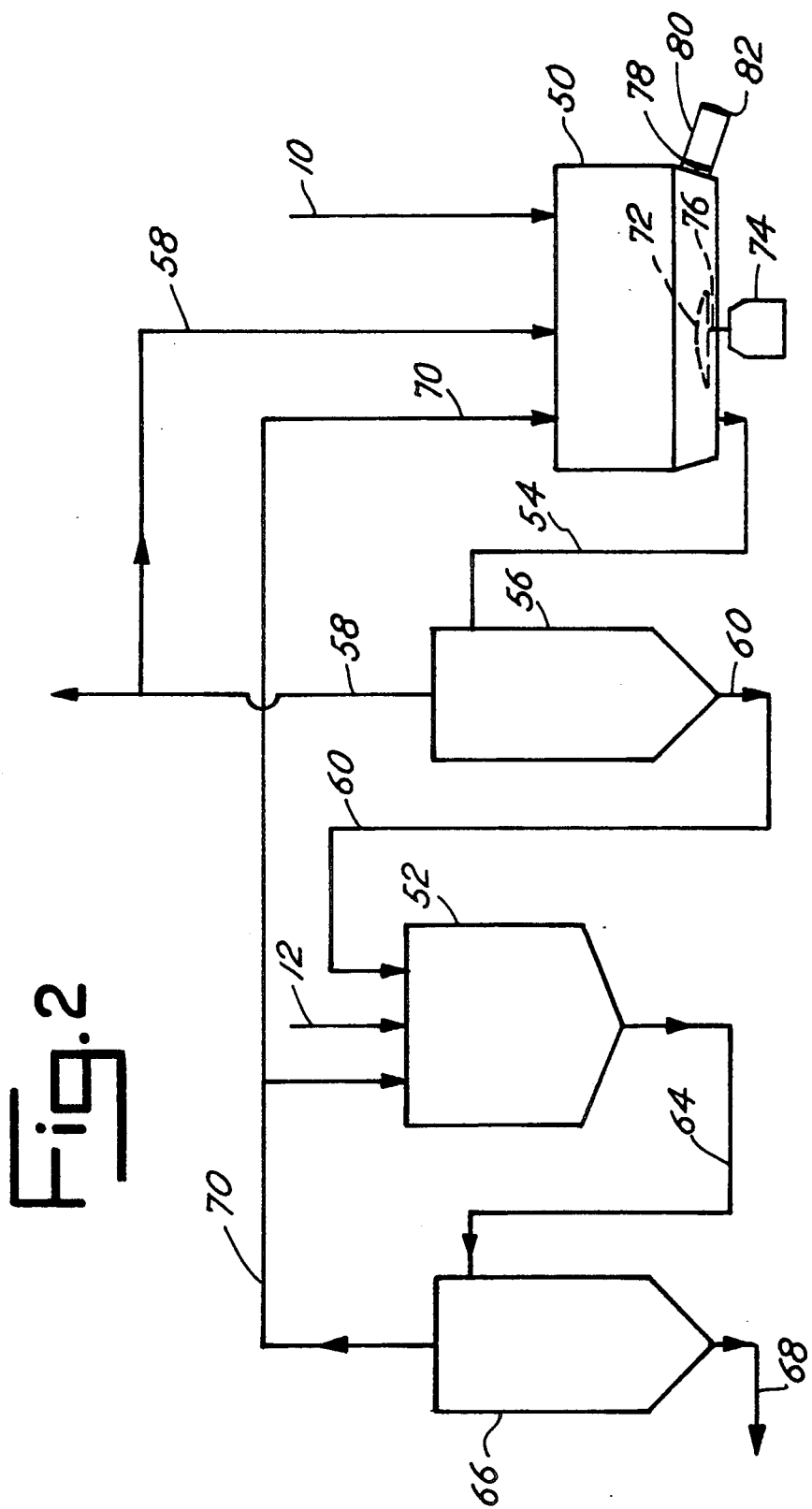
FIG. 2 is a schematic flow diagram of a preferred multi-stage extraction system of the invention.

FIG. 2 is a schematic flow diagram of a two stage extraction system of this invention. The mixed waste contaminated solids 10 and extractant solution 12 move counter currently through the two stage extraction system. Therefore, mixed waste 10 is introduced into a first stage extractor 50 and fresh extractant solution 12 is introduced into a second stage extractor 52. Because most of the oversized debris is size reduced or physically removed from the first stage extractor, the second stage extractor may be any known solid/liquid contacting operation, such as a stirred tank.

The first extraction stage includes first stage extractor 50 and the first stage solid/liquid separator 56. Mixed waste 10 is mixed with the second stage contaminated liquid stream 70 to define a first stage extraction liquor 54. The first stage extraction liquor 54 is directed to the first stage solid/liquid separator 56 where it is separated into a first stage contaminated liquid stream 58 and a first stage concentrated solid stream 60. The majority of the first stage contaminated liquid stream or blowdown liquid 58 is recycled to the first stage extractor 50. A small blowdown stream containing the concentrated contaminants is sent to the evaporative reactor 32. The underflow slurry from the first stage solid/liquid separator first stage 60 is directed to the second stage extractor 52.

The second stage extractor 52 accepts feeds comprising the first stage underflow slurry 60 and fresh extractant solution 12. The feeds are combined in second extractor 52 to produce a second stage extraction liquor 64. The second stage extraction liquor 64 is directed to second stage solid/liquid separator 66 which separates it into a second stage concentrated solids stream 68 or slurry of solids for filtration, and a second stage contaminated liquid stream 70. The second stage contaminated liquid stream 70 is primarily recycled to the second stage extractor 52, while the underflow solids slurry 68 is directed to the filtration system.

The first stage extractor 50 includes a rotating blade 72. The rotating blade 72 is attached to motor 74 which causes rotating blade 72 to grind, mix and emulsify the contents of the extractor. The blended extraction liquor flowing from the pulper type mixer passes through screen 76 before leaving the first stage extractor to subsequent stages. Screen 76 prevents oversized or nonflowable material from passing into the solid/liquid separator.

Oversized materials are intermittently removed from the waste pulper by opening first valve 78. First valve 78 directs the solid waste fraction and some liquid into a basket strainer 80. When the basket strainer 80 is full, valve 78 is closed. Liquid material that accumulates in basket strainer 80 is returned to the extractor. When basket strainer 80 is emptied of liquid, second valve 82 is opened and the oversized material in the basket strainer 80 falls into oversized material accumulator. Second valve 82 is then closed, and the process is repeated as necessary.

We claim as our invention:

1. A process comprising: continuously treating mixed waste containing solids contaminated with radionuclides, volatile chemically oxidizable pollutants, and nonvolatile pollutants comprising toxic metals, in combination, the steps of:
   (a) mixing the mixed waste and an extractant solution at conditions sufficient to effect the mass transfer of at least a porion of the radionuclides, volatile chemically oxidizable pollutants, and nonvolatile pollutants from the solids present in the mixed waste to the extraction solution;
   (b) removing the solids from the mixture of step (a) initially present in the mixed waste;
   (c) mixing the solids from step (b) with a treated water stream;
   (d) filtering and pressing the mixture from step (c) to form a filter cake and a dilute contaminant liquid stream;
   (e) recycling the dilute contaminant liquid stream to the mixture of step (a);
   (f) removing a contaminated liquid stream comprising the radionuclides, volatile chemically oxidizable pollutants, and nonvolatile pollutants from the mixture of step (a);
   (g) continuously concentrating the radionuclides and nonvolatile pollutants in the contaminated liquid stream by continuous evaporation that simultaneously produces a first stream comprising the concentrated radionuclides and nonvolatile pollutants and a second water rich vapor phase stream substantially free of minerals, dissolved solids and metals, and comprising the volatile chemically oxidizable pollutants originally present in the contaminated liquid stream;
   (h) removing the first stream comprising concentrated radionuclides and nonvolatile pollutants;
   (i) contacting substantially all of the second stream with a solid oxidation catalyst in the presence of steam at gas phase oxidation conditions to convert the volatile chemically oxidizable pollutants, thereby producing a gaseous reaction product comprising steam and incondensible gases, the solid oxidation catalyst comprising an inorganic oxide support containing at least one metal oxide;
   (j) condensing and scrubbing the steam from step (i) to produce the treated water stream; and,
   (k) recycling the treated water from step (j) for mixing with the solids from step (b) and with the mixed waste and extraction solution of Step (2).

2. The process of claim 1 further characterized in that the extractant solution comprises water and additives selected from the group consisting of acids, bases, surfactants, chelating agents, emulsifying agents and mixtures thereof.

3. The process of claim 1 further characterized in that the quantity of steam in the second stream is at least 2 times the weight of the volatile chemically oxidizable pollutants.

4. The process of claim 1 further characterized in that the second stream is admixed with an oxygen containing stream.

5. The process of claim 1 further characterized in that the second stream is heated by direct fired heating prior to catalytic oxidation.

6. The process of claim 1 further characterized in that the gas phase conditions comprise a reaction temperature from about 371° C. to about 677° C., a gas space velocity from about 5 to about 100 sec$^{-1}$ and a pressure of from about atmospheric to about 446 kPa (abs).

7. The process of claim 1 further characterized in that the second stream is contacted with a solid catalyst.

8. The process of claim 7 further characterized in that the solid catalyst comprises an inorganic oxide support containing at least one metal oxide catalyst.

9. The process of claim 8 further characterized in that the metal oxide catalyst is formed from a nonprecious metal.

10. The process of claim 8 further characterized in that the metal oxide catalyst comprises chromium and the inorganic support comprises alumina.

11. The process of claim 1 further characterized in that step (a) includes multiple extraction stages.

12. The process of claim 11 further characterizes in that each extraction stage includes an extraction step followed by a solid/liquid separation step.

13. The process of claim 12 further characterizes in that at least one extraction stage is accomplished with a waste pulper.

14. The process of claim 12 further characterizes in that the solid/liquid separation step is accomplished with a cyclone.

15. The process of claim 1 further characterized in that step (a) consists of two extraction stages.

16. The process of claim 1 further characterized in that oversized materials are removed from the mixture of step (a).

* * * * *